Dec. 7, 1926. 1,609,692
A. CELLINO
PRIMARY AND SECONDARY ELECTRIC CELL
Filed Nov. 6, 1924
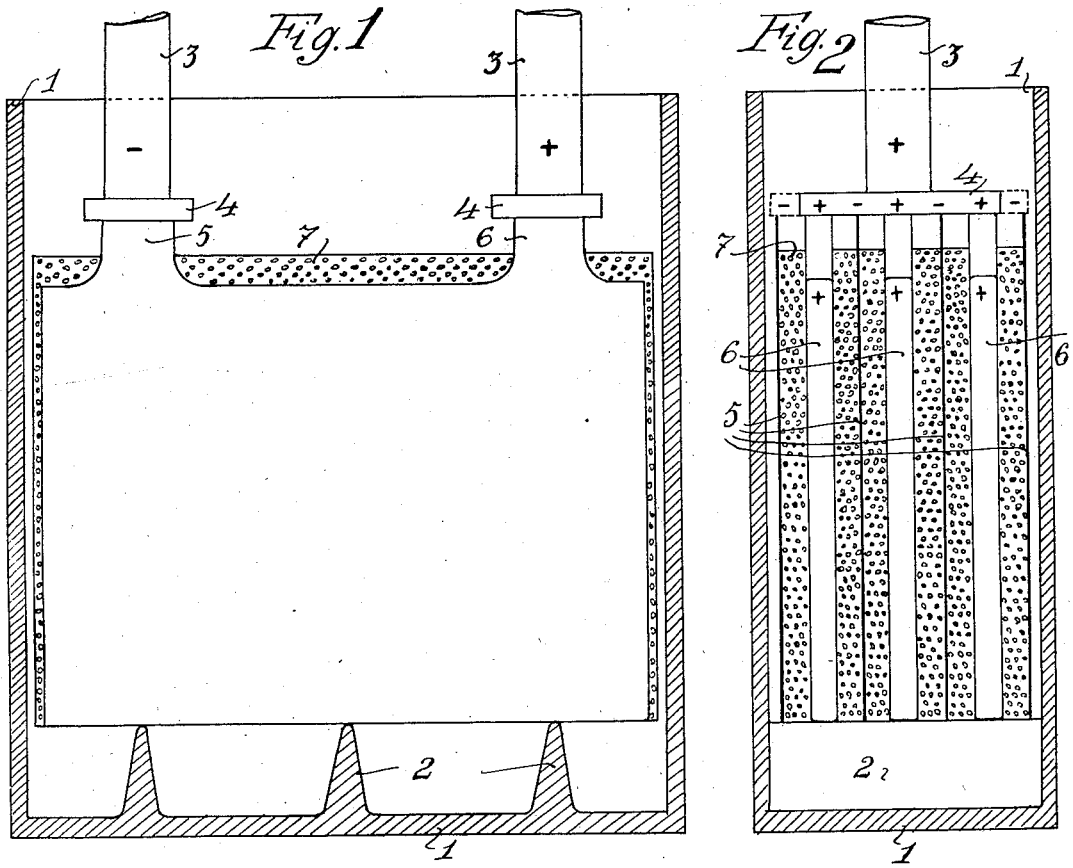
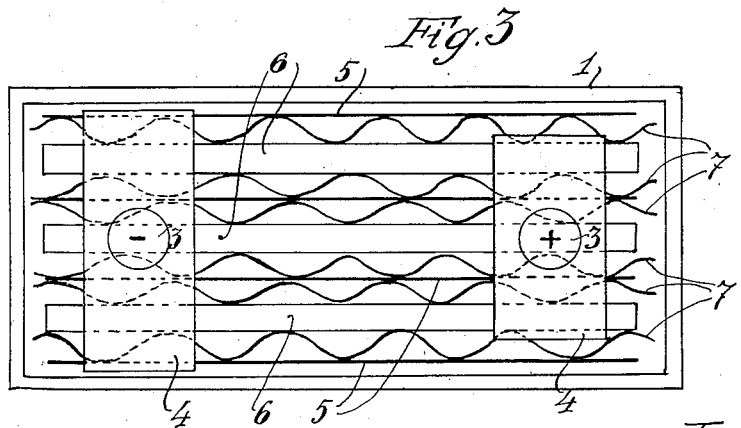

Patented Dec. 7, 1926.

1,609,692

UNITED STATES PATENT OFFICE.

ATTILIO CELLINO, OF ROME, ITALY.

PRIMARY AND SECONDARY ELECTRIC CELL.

Application filed November 6, 1924, Serial No. 748,282, and in Italy November 22, 1923.

This invention has for its object an improved form of electric cell adapted to operate as a secondary cell or accumulator and to operate with a higher voltage and lower weight of cell for the amount of energy delivered than do the ordinary cells now in use.

While secondary cells employing plates of zinc, lead peroxide, and electrolytes of sulphuric acid, are well known, such cells are not commercially practical because of the local action, the chemical solution of the zinc, and the non-uniformity and lack of adherence of the electrolytic deposit.

An object of my invention is to prevent difficulties which have existed in cells of this type, and I accomplish this object by the use of a new and improved electrolyte.

For a further understanding of my invention, reference may be had to the accompanying drawings, wherein:

Fig. 1 is a longitudinal section through an accumulator according to the invention.

Fig. 2 is a transverse section through such accumulator.

Fig. 3 is a top plan view of the accumulator.

In the drawing a casing 1, of hard rubber, for example, for the electrolyte, is supplied with insulating supports 2, for the negative and positive plates 5 and 6. The plates are connected to the positive and negative terminals 3, by means of connectors or straps 4 which form the positive and negative groups. The positive and negative plates are separated by partitions 7.

The positive plates 6 can be lead peroxide plates, of the type commonly used in accumulators. The negative plates 5 can be formed of thin sheets of a conducting metal, such, for example, as zinc, aluminium, lead, brass, copper and the like. While I have shown a plurality of positive and negative plates, it is obvious that only one each, or any desired number, of such plates, can be used.

The electrolyte is formed as follows: In a vessel containing a solution of about 10% of silicate of sodium in distilled water are immersed a lead pole or conductor and a second pole or conductor formed, for example, by an aluminium plate, and a continuous or alternating electric current is caused to pass between them. During the passage of the current, the aluminium is attacked and a whitish liquid is produced, which after filtration is acidified by the addition of pure sulphuric acid until a density of about 1.16 spec. grav. is reached. The solution then has added to it about 6% of zinc sulphate.

When the cell made up of positive and negative plates as described, immersed in the solution produced in the manner above described, is submitted to a charge, there will be formed on the negative plates, a layer which is insoluble when the circuit is open, and which, on the cell being connected to discharge through an electric apparatus, dissolves again so as to produce the passage of current.

The charge may also be carried out with alternating current by connecting the poles of the generator respectively with the positive pole of the cell or cells and with an auxiliary pole or poles formed by a piece of pure aluminium immersed in the electrolyte.

In this case, on account of the well known phenomenon that the current can pass through the electrolyte only from the lead to the pure aluminium, and not from the aluminium to the lead, the electrolyte is traversed by a unidirectional current which produces the charge during and after which the metal that has been deposited on the auxiliary aluminium pole passes spontaneously onto the negative plates of the cell.

If desired, the auxiliary pole or poles of pure aluminium can be mounted permanently in the cell and be connected on the outside to a terminal which will be used only during the charging operation.

While I have described one form of cell, it is obvious that many forms may be used without departing from the spirit of my invention, and in the appended claims I seek to cover all of such forms.

What I claim is:

1. A process for forming an electrolyte, comprising, passing an electric current between poles consisting respectively of lead and of aluminium immersed in a solution of silicate of sodium and distilled water, until a whitish liquid is produced, filtering said liquid and then acidifying the liquid by the addition of pure sulphuric acid.

2. A process for forming an electrolyte, comprising, passing an electric current between poles consisting respectively of lead and of aluminium immersed in a solution of silicate of sodium in distilled water, until a whitish liquid is formed, filtering said liquid, acidifying the liquid with pure sulphuric acid until the solution has a density of about 1.16 spec. grav. and then adding zinc sulphate to the solution.

3. A process for forming an electrolyte, comprising, an electric current between poles consisting respectively of lead and of aluminium immersed in a solution of about 10 per cent of silicate of sodium in distilled water, until the aluminium is attacked and a whitish liquid is produced, filtering said liquid, acidifying the liquid by the addition of pure sulphuric acid until the solution has a density of about 1.16 spec. grav. and then adding about 6 per cent of zinc sulphate to the solution.

4. An electrolyte formed by immersing lead and aluminium poles in a solution of silicate of sodium in distilled water, passing an electric current between said poles until the aluminium is attacked and a whitish liquid is produced, filtering said liquid, acidifying the liquid by the addition of pure sulphuric acid thereto, and then adding zinc sulphate to the liquid.

5. An electrolyte formed by immersing, in a solution of silicate of sodium in distilled water, lead and aluminium poles, passing an electric current between the poles until the aluminium is attacked and a whitish liquid is produced, filtering the whitish liquid, acidifying the liquid by the addition of pure sulphuric acid thereto until the solution has a density of about 1.16 spec. grav. and then adding zinc sulphate to the solution.

6. An electrolyte formed by immersing lead and aluminium poles in a solution of about 10 per cent of silicate of sodium in distilled water, passing an electric current between said poles until the aluminium is attacked and a whitish liquid is produced, filtering the whitish liquid, acidifying the liquid by the addition of pure sulphuric acid thereto until the solution has a density of about 1.16 spec. grav. and then adding about 6 per cent of zinc sulphate to the solution.

In testimony whereof I have signed my name to this specification.

ATTILIO CELLINO.